Figure 1:
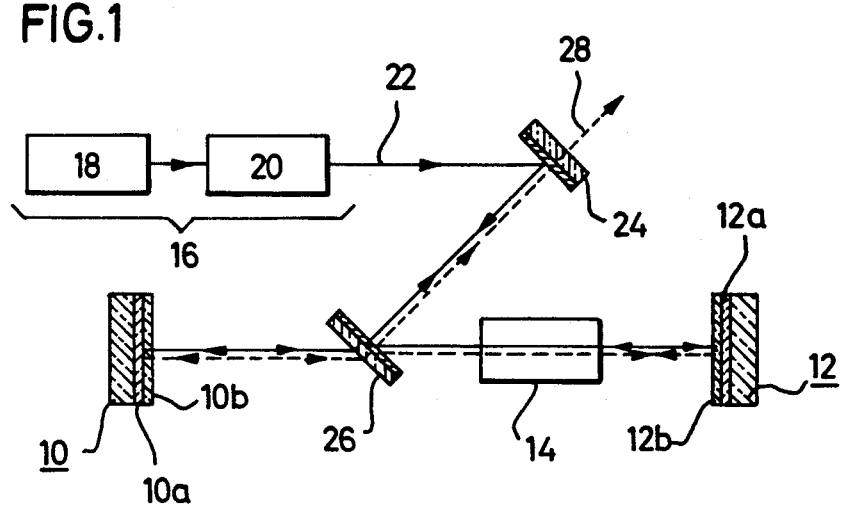

United States Patent [19]
Guilino

[11] 4,085,335
[45] Apr. 18, 1978

[54] OPTICAL PARAMETRIC DEVICE

[75] Inventor: Ernst Guilino, Munich, Germany

[73] Assignee: Garching Instrumente-Gesellschaft zur industriellen Nutzung von Forschungsergebnissen mbH, Garching, Germany

[21] Appl. No.: 763,108

[22] Filed: Jan. 27, 1977

[30] Foreign Application Priority Data

Feb. 18, 1976 Germany .............................. 2606526

[51] Int. Cl.² .............................................. H02M 5/04
[52] U.S. Cl. .................... 307/88.3; 333/83 R
[58] Field of Search .............. 307/88.3; 321/69 R; 331/107 R

[56] References Cited

U.S. PATENT DOCUMENTS 3,487,230   12/1969   Costich ............................... 307/88.3

OTHER PUBLICATIONS

Harris, "Proc. IEEE", Dec. 1969, pp. 2096-2113.

*Primary Examiner*—Rudolph V. Rolinec
*Assistant Examiner*—Darwin R. Hostetter
*Attorney, Agent, or Firm*—Flynn & Frishauf

[57] ABSTRACT

A resonator, including a radiation generator, mirrors located at either side of the radiation generator in the path of radiation emitted from the generator, and a coupling means are arranged to couple primary radiation of predetermined frequency into the resonator and extract secondary radiation therefrom at a frequency which is shifted with respect to the frequency of the primary radiation, the frequency shift arising due to parametric interaction of the primary radiation. In accordance with the invention, the coupling means includes dichroic mirrors located in the path of radiation of the optical resonator at an inclination with respect to the path and having the characteristic of being highly reflective for radiation of the wavelength of the primary radiation and highly transmissive to radiation of a wavelength of the secondary radiation.

10 Claims, 2 Drawing Figures

OPTICAL PARAMETRIC DEVICE

Cross-reference to related literature: "Tunable Optical Parametric Oscillators", by Stephen E. Harris, proceedings of the IEEE, Vol. 57, No. 12, December 1969, pages 2096 to 2113 (including references cited).

The present invention relates to an optic parametric device including a resonator defined by mirrors and an optically nonlinear medium located within the resonator path between the mirrors. A coupling device is provided to couple primary radiation of predetermined frequency into the resonator, and to couple out secondary radiation which is frequency shifted with respect to the primary radiation, the secondary radiation being generated by parametric interaction in the nonlinear optical medium from the primary radiation within, or from the optical radiator.

Known optical parametric devices are described in the cross-reference literature, specifically "Harris: Tunable Optical Parametric Oscillators", 57 Proc. of IEEE 2096 to 2113, December 1969.

Optical parametric systems can be used to generate secondary radiation derived from a monochromatic coherent primary radiation by means of an optically nonlinear medium to parametric interaction. The secondary radiation has two components, one of which has a shorter wavelength and the other a longer wavelength both being longer than the wavelength of the primary radiation. The wavelength of a secondary radiation component can be freely selected and can be adjusted by suitable arrangement, typically, rotation, of the optically nonlinear medium within the optical resonator of the parametric system. The wavelength of the other component will then be determined based on energy conservation. The optical parametric system can be used in combination with a coherent source of primary radiation, for example a laser to provide a source of optical radiation whose wavelength can be selected more or less as desired within a predetermined frequency range.

Usually crystals are used as the optically nonlinear materials. These are dielectric, or ferroelectric crystals, for example KDP, $LiNbO_3$, $Ba_2Na(NbO_3)_5$ ("Banana") or $LiJO_3$. The previously known nonlinear media have comparatively weak parametric interaction. In actual practice it is therefore necessary that the nonlinear medium is located within an optical resonator formed by mirrors, so that the radiation passes repeatedly through the medium. This causes a substantial problem with respect to the coupling in, and coupling out of radiation into, and from the optical resonator, respectively. The coupling in, and coupling out of the radiation usually was done through the mirrors which defined the resonator. The mirrors, therefore, should be highly transmissive for the primary radiation and highly reflective for the secondary radiation. This requirement is difficult to meet particularly when the parametric arrangement should be continuously tunable regarding the wavelength of the secondary radiation, since the mirrors then have to be highly reflective at a region close to the wavelength of the primary radiation and the range of high reflectivity should be wide over a wide range of wavelengths; the reflectivity, in actual practice, should be at least 80 to 95%. Even the most highly developed dichroic mirror made of multiple dielectric layers meet this requirement only partially and with high cost. It is therefore necessary, in actual practice, to break up the tuning range in a multiplicity of subranges, each of which require a separate set of mirrors. Tuning over the tuning range of the instrument is thus impeded due to the repetitive change of mirrors, and the costs for the various sets of mirrors is extremely high. The requirement of high transparency in the wavelength of the primary radiation is in conflict with the requirement of high reflectivity at the wavelength of secondary radiation, since the secondary radiation may contain subharmonics of the primary radiation.

It is an object of the present invention to provide an optical parametric device and system which has high efficiency while still using inexpensive and ready-made mirrors.

SUBJECT MATTER OF THE PRESENT INVENTION

Briefly, the coupling means, or arrangement in the parametric system includes a dichroic mirror located in the path of the optical resonator which dichroic mirror is arranged at an inclination with respect to the path of radiation in the resonator, the mirror having the characteristic that it has a high reflectivity for the primary radiation while having a high transmissivity for the secondary radiation.

Dichroic mirrors which have a high reflectivity within a predetermined narrow range of wavelengths, but are essentially transparent otherwise can be made much more inexpensively and simpler than mirrors haing high band pass or low band pass characteristics, such as the mirrors used in the parametric systems of the prior art. No specific requirements regarding wavelength selectivity are placed on the resonator mirror; the resonator mirror can thus be made as a metal mirror which is characterized by a high reflective coefficient within the entire range of wavelength of interest. Such mirrors can be inexpensively prepared. A tunable optical parametric device in accordance with the present invention thus can be tuned over practically the physically possible entire wavelength range with a single set of mirrors. The tuning range is that which can be obtained by means of the specific parametric crystal. Switching over to primary radiation wavelengths which are different requires, in principle, only exchange of the mirror which is located at an inclination within the optical path of the resonator.

Figure 2:
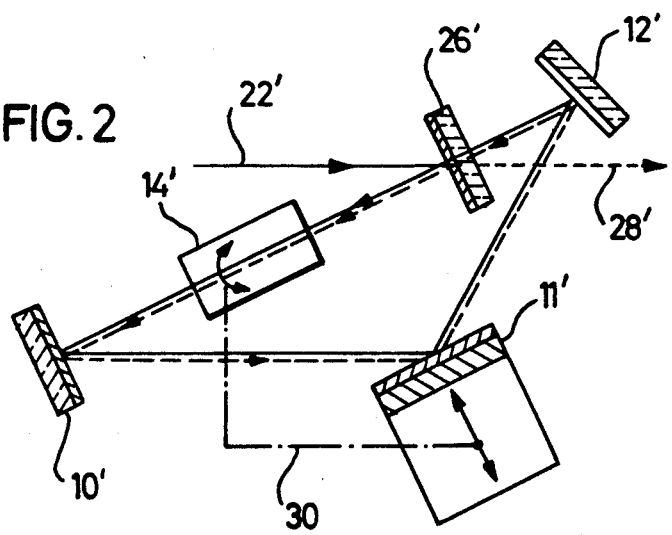

The invention will be described by way of example with reference to the accompanying drawings, wherein:

FIG. 1 is a schematic illustration of an optical parametric system in accordance with a first embodiment of the invention; and FIG. 2 is a corresponding schematic representation of a second embodiment of the invention.

The drawings illustrate only the important features of the invention, necessary for an understanding thereof; the literature reference above given is referred to for further details of instruments.

FIG. 1: an optical resonator is provided, defined by two resonator mirrors 10, 12. An optical nonlinear parametric medium is located in the path of radiation between the two mirrors 10, 12. The parametric medium may be any one of the above referred to, and well known crystals which is located, as known, in a crystal cell 14.

The primary radiation for the parametric system is generated by a source 16 which, for example, includes a ruby or Nd:YAG laser 18 and a frequency doubler unit 20. The source 16 delivers a monochromatic coherent bundle of radiation 22 which is coupled by two coupling mirrors 24, 26 into the optical resonator. The coupling mirrors 24, 26 only reflect within a narrow range, or band of wave lengths. This narrow range spans the wavelength of radiation generated by source 16. The mirrors are effectively transparent to other wavelengths. The mirrors may, for example, be made as dielectric multiple layers placed on a substraight highly pure quartz glass. When using frequency doubled ruby laser radiation, the maximum reflection is at 347nm at the optically 100% level; in actual practice it may have a half value width of ± 20nm. Mirrors of this type can be made inexpensively; the transmissivity for wavelength above the reflection range to the transmissivity of the substrate may be about 87 to 95%.

The resonator mirrors 10 and 12 can be made of a metal coating, for example a silver layer or deposit on a suitable substrate for example a plate of quartz glass, which is capable of reflecting primary radiation as well as secondary radiation.

The resonator mirrors 10, 12 have metal layers 10a, 12a applied thereto. The metal layers 10a, 12a can be protected against damage due to the intensive primary radiation by coating them with dielectric multiple layers shown collectively at 10b, 12b. These protective dielectric layers should be highly reflective for primary radiation otherwise transparent. The multiple layers can be applied, in actual practice, essentially simultaneously with coating of the coupling mirrors; they, therefore, hardly increase the cost of the system.

The secondary radiation is coupled out of the optical resonator by means of mirror 26. Mirror 26 has a remaining reflection within the path range which is sufficient therefor. A small portion of the secondary radiation reflected from the resonator mirror 12 to the resonator mirror 10 is coupled out by the coupling mirror 26 from the resonator and reflected to the coupling mirror 24. The major portion of this reflected radiation is passed by the coupling mirror 24, as indicated by the broken line arrow 28. The radiation coupled out in accordance with arrow 28 can be filtered additionally, if desired, and then utilized and forms the output signal which the system is intended to provide.

The principle of the present invention can be used with particular advantage in parametric systems using a ring, or loop cavity resonator, as discussed in the aforementioned reference with respect to FIG. 19.

Embodiment of FIG. 2: FIG. 2 illustrates, in general, the application of the present invention to a ring cavity resonator. The optical resonator is defined by three mirrors 10', 11', 12' which are so oriented with respect to each other that a triangular resonator radiation path will result. This radiation path is closed, and thus can be termed "ring shaped" path, or a loop path. Mirrors 10', 11', 12' can be constructed as discussed with respect to mirrors 10 and 12 of FIG. 1.

A crystal cell 14' with an optically nonlinear medium is located within the radiation path of the resonator; this corresponds to cell 14 of FIG. 1.

Primary radiation 22' is coupled into the resonator by the same mirror which also couples out the secondary radiation 28'. Only a single coupling mirror 26' is thus needed when using the embodiment of FIG. 2. This mirror corresponds to mirror 26 of FIG. 1 and, like the mirror 26 of FIG. 1, has a narrow range of reflectivity, matched to the wavelength of the primary radiation; otherwise it is essentially transparent. The coupling mirror 26', in accordance with FIG. 2, is so arranged that primary radiation coupled into the path is applied to the crystal cell 14' without further reflection. The wavelength of a component of the secondary radiation can be adjusted by rotating the crystal cell 14'. Preferably, the additional mirror 11' is also moved perpendicularly with respect to its mirror plane concurrently with the rotation of the crystal cell 14 in such a manner that the optical resonator is always optimally tuned to the wavelength of the signal component of the secondary radiation. The coupling and simultaneous adjustment of the crystal cell 14' and of the mirror 11' is schematically indicated by the chain dotted line 30; adjustment of the cell 14' by rotation and of mirror 11' by movement perpendicular to its plane of reflection is indicated by the respective arrows in the symbolic representation in the figure.

The arrangement of the system in accordance with FIG. 2 has an advantage over that of FIG. 1. The crystal cell has primary radiation and secondary radiation passing therethrough only in a single direction; reconversion of secondary radiation into primary radiation thus cannot occur. The quality of resonance is higher in spite of the additional resonator mirror than in the embodiment of FIG. 1, since losses can be avoided which occur upon passing of radiation through the cell 14 in counter direction. Theoretically, doubled conversion effectiveness is obtainable with respect to the arrangement of FIG. 1. The loading on the crystal by primary radiation is only half as much. Changeover to a different wavelength of primary radiation is particularly simple and inexpensive since only a single new coupling mirror must be used and, if necessary, only a different, or otherwise cut crystal is need in crystal cell 14'.

In actual practice, the adjustment of mirror 11' in the direction indicated by the double arrow by about 5mm is sufficient; the crystal cell can rotate by ± 20°. In use, a parametric oscillator in accordance with either FIGS. 1 or 2 can provide a range of signal wavelengths of from about 0.4 to 4 micrometers and, with some interruptions, up to even about 6 micrometers.

Various change in modifications may be made within the scope of the inventive concept.

I claim:
1. Tunable optic parametric device having
a source of primary radiation (16);
an optical resonator including an optically non-linear medium (14) and mirrors (10, 12; 10', 11', 12') located at either side of the medium and in the path of radiation passing through the medium;
coupling means (26) to couple primary radiation of predetermined frequency into the resonator and to extract secondary radiation from the resonator at a frequency which is shifted with respect to the frequency of the primary radiation and arising due to parametric interaction of the primary radiation in the resonator
the coupling means (26, 26') comprising at least one dichroic mirror (26, 26') located in the path of radiation of the optical resonator at an inclination with respect to said path and having the characteristic of being highly reflective for radiation of the wavelength of the primary radiation and being highly transmissive to radiation of the wavelength of the secondary radiation.

2. Device according to claim 1, wherein the coupling dichroic mirror (26, 26') is formed with an interference layer having a maximum reflection coefficient at the wavelength of the primary radiation and having a high coefficient of transmission in the range of wavelengths of the secondary radiation.

3. Device according to claim 2, wherein the mirrors (10, 12; 10', 11', 12') limiting the optical resonator include a metalic reflection layer.

4. Device according to claim 3, further including a dielectric multiple layer system (10b, 12b) applied to the metallic reflection layer of the mirrors (10, 12; 10', 11', 12') limiting the resonator, the dielectric multiple layers having a reflection maximum at the wavelength of the primary radiation.

5. Device according to claim 1, wherein (FIG. 1) the coupling means includes a second dichroic mirror (24) coupling the primary radiation to the resonator, the second coupling mirror (24) having a maximum coefficient of reflection at the wavelength of the primary radiation, and being arranged to reflect primary radiation to said dichroic coupling mirror (26) located in the path of radiation of the optical resonator.

6. Device according to claim 1, wherein (FIG. 2) the optical resonator is formed as a closed loop path of radiation including at least 3 mirrors (10', 11', 12') located to reflect the radiation within the resonator in a closed loop, whereby the resonator radiation has a ring-shaped geometry.

7. Device according to claim 6, wherein the non-linear medium (14') is rotatable;
and one of the resonator mirrors (11') is movable in a direction to change the optical length of the resonator closed loop path.

8. Device according to claim 7, further comprising interconnected coupling (30) effecting, simultaneously, rotation of the non-linear medium (14') and adjustment of the position of the adjustable resonator mirror (11').

9. Device according to claim 1, wherein the dichroic mirror (26, 26') forming the coupling means is so located in the path of radiation of the resonator that primary radiation reflected by said coupling mirror is applied to the optically non-linear medium without preceding reflection by a mirror of the optical resonator.

10. Device according to claim 6, wherein the direction of adjustment of the adjustable mirror (11') is perpendicular to its plane of reflection.

* * * * *